Patented May 30, 1950

2,509,203

UNITED STATES PATENT OFFICE 2,509,203

POLYMERIZED ALKYL FUMARATES AND PROCESS

Jeffrey H. Bartlett, Westfield, N. J., assignor to Standard Oil Development Company, a corporation of Delaware No Drawing. Application December 29, 1945, Serial No. 638,444

8 Claims. (Cl. 260—485)

This invention relates to novel chemical products and to a process of preparing and using same.

More particularly it relates to a novel product made by polymerization of lauryl fumarate, which polymer has been found particularly useful as an additive for lubricating oil, both for depressing or lowering the pour point thereof and for improving viscosity index thereof.

It has heretofore been suggested to make pour depressors for waxy lubricating oils by Friedel-Crafts condensation of an aliphatic material such as chlorinated parraffin wax with an aromatic material such as naphthalene or phenol, but the resulting products, although very satisfactory for such purposes, are not viscosity index improvers. It has also been suggested to make lubricating oil additives by polymerization of an unsaturated ester such as the vinyl ester of stearic acid, or by polymerization of acrylic acid esters such as octadecyl acrylate, or condensation polymers of an unsaturated alcohol and an unsaturated acid. Some of such products have shown good viscosity index improving properties but not good pour depressing properties, and some vice versa, and some, especially the latter ones, have shown a tendency toward gel formation and toward becoming insoluble in highly paraffinic lubricating oil base stocks. Attempts have also been made to produce a pour depressor by polymerization of an unsaturated ester such as decyl fumarate, but the resulting polymer is found to have substantially no pour depressing properties.

The present invention is based on a very surprising discovery that the normal $C_{12}$ saturated alcohol, called lauryl alcohol or dodecyl alcohol, is the only one out of the entire list of saturated aliphatic alcohols having 1 to 18 carbon atoms which, when esterified with fumaric acid and then polymerized, makes a product having excellent pour depressing properties when added to waxy mineral lubricating oils in small amounts. The n-tetradecyl ($C_{14}$) alcohol produced a fumarate polymer having fair pour depressing properties, and, if available, the $C_{13}$ alcohol probably would also give good results, but alcohols having 16 or more, or having 10 or less, carbon atoms had no pour depressing properties whatsoever. The monomers, of course, also has no pour depressing or V. I. (viscosity index) improving properties.

In carrying out the invention as applied to n-lauryl alcohol, lauryl fumarate is first prepared either by direct esterification of lauryl alcohol with fumaric acid which is a dibasic olefinic acid having the formula:

trans HOOC—CH=CH—COOH or by ester interchange, i. e. by reacting lauryl alcohol with a lower alkyl fumarate such as a methyl fumarate or di-ethyl fumarate, these esterfication reactions being known in a general way. The lauryl fumarate is then polymerized, preferably by the use of a peroxide catalyst, such as benzoyl peroxide or acetyl peroxide, etc. Temperatures in the range of 50° to 150° C. are suitable when using 0.1 to 5.0% by weight of catalyst and the time may be approximately from 5 to 100 hours or so, preferably about 10 to 50 hours at a temperature of around 75° to 85° C. Oxygen should be excluded during polymerization, by using an inert gas such as nitrogen, $CH_4$, $C_2H_6$, HCl, $H_2$, $SO_2$, etc. If desired, an inert solvent such as heptane, iso-octane, cyclohexane, etc. may be employed as a diluent to control polymer molecular weight.

The effect of the molecular weight of the lauryl fumarate polymer is relatively great from the point of view of viscosity index, but relatively little from the point of view of pour point. The higher the molecular weight, the greater will be the viscosity index obtained with a given quantity of polymer, and for this reason molecular weights up to 20,000 or 30,000 or even up to about 40,000 may be employed where an increase in viscosity index is desired; but when the polymer is used chiefly for its pour depressing effect, molecular weights may be considerably lower such as from 10,000 down to 5,000 or even 1,000 or so. These molecular weights may be determined by the well-known Staudinger viscosity method, using a di-isobutylene solution containing 5 mg. of the polymer per cc. of solution. The polymer per se should generally have a viscosity of about 100 to 2,000 seconds Saybolt at 210° F.

If desired, the entire crude polymer product may be used, or it may be separated into fractions of any desired molecular weight range, as by successive precipitation of various fractions from solution in a solvent such as heptane, by a precipitant such as methyl or ethyl alcohol or isopropyl alcohol or a mixture of alcohols.

The invention is applicable to derivatives or homologs of fumaric acid such as chlorofumaric acid, mesaconic acid and the chloromesaconic acid. Such acids, however, must be of the fumaroid type and not capable of forming anhydrides.

The alkyl residue of the alcohol of 12-14 carbon atoms may also contain various substituents such as alkoxy, halogen, NH₂, NO₂, SO₃H, CN and other groups as long as they do not interfere with the polymerization properties of the ester.

In general it is preferable that the alkyl fumarate ester be essentially neutral although small quantities of the half ester appear to have no harmful effects on the polymerization reaction or on the properties of the resultant polymer although peroxide type of catalysts are especially suitable for the polymerization, such as benzoyl peroxide, urea peroxide, etc. However, valuable polymers are also produced by heating without a catalyst or by the use of clay, alumina, etc. Valuable polymers are also produced by voltolization. When catalysts are involved in the polymerization they may be added to the ester in a variety of ways. All the catalyst may be added at once or may be added over a rather long period of time. It may also be dispersed in an inert liquid. Furthermore, the monomer may be partially polymerized by one method and completed by another method. Hence, various methods may be used or various combinations of methods in the polymerization procedure.

The amount of lauryl fumarate or tetradecyl fumarate polymer to be used in the oil base stock, depends upon whether the primary purpose to be accomplished is improvement of pour point or viscosity index, and also depends upon the molecular weight range of the polymer, as well as to some extent upon the nature of the oil base stock, but generally the amount of polymer to be used will range from about .01% to 10%, the preferred range being 0.1% to 5% by weight, the smaller amounts being used when pour depressing only is required, and the larger amounts for viscosity index improvement alone or together with pour depressing.

The oil base stock to be used is selected according to the purpose for which the blend is to be used. For instance, as a crankcase lubricant for an internal combustion engine, generally, mineral lubricating oils are used having a viscosity range of about 40 to 200 seconds Saybolt at 210° F. For such purposes, it is preferred to use waxy mineral lubricating oils of the paraffinic type which normally have a viscosity index in the range of 90 to 115, although naphthenic lubricating oils may also be used, especially when enough of the fumarate polymer is used to raise the viscosity index substantially. The oil base stock may also be a lighter mineral oil fraction such as one of the gas oil or even the kerosene boiling range such as used for hydraulic oil purposes or gun recoil oil, etc. Small amounts of this polymer may also be used in Diesel fuels to reduce the pour point or cloud point or both, particularly when the oil base stock is a highly paraffinic gas oil base stock.

The objects, advantages and details of the invention will be better understood from the following experimental data.

*Example 1*

Didecyl fumarate was prepared by esterification of fumaric acid with n-decyl alcohol and the resulting didecyl fumarate was polymerized at 80° C. for sixteen hours with 0.5 weight per cent benzoyl peroxide and catalyst. The total product which was a heavy oil was dissolved in benzene, and methanol was then added to precipitate the polymer. Blends containing 0.2 weight percent of this polymer were made in three different test oils which were all paraffinic in nature and which had pour points ranging from +5° F. to +30° F. The didecyl fumarate polymer had no substantial pour depressing property in any of the three blends. Similarly negative results were obtained with polymers of di-n-butyl fumarate, di-n-hexyl fumarate, di-n-octyl fumarate and di-2-ethylhexyl fumarate, all of this series of fumarates having less than 10 carbon atoms in the alkyl group. Dimethyl fumarate was also tried but it would not even polymerize. Thus, the fumarate polymers of the decyl alcohol, having 10 carbon atoms, and all lower alcohols, did not give any pour depressing properties. A higher alcohol was tried having 18 carbon atoms, namely di-octadecyl fumarate polymer, but it likewise had no pour depressing properties. Further attempts were made, using alcohols having 12, 14 and 16 carbon atoms, with the surprising discovery that although the C₁₆ alcohol, namely cetyl alcohol, was just as ineffective as all of the others tried, and the C₁₄ showed fair pour depressing properties especially when the polymer had a viscosity of about 60 to 400 seconds Saybolt at 210° F., yet the C₁₂ alcohol, namely n-lauryl, was found to produce an excellent pour depressor, and in all three base stocks, showing good general pour depressing characteristics. The lauryl alcohol used was of the highest purity obtainable, being at least 90% pure.

In making these tests, the general method used was first to make a mixture of one mol of fumaric acid with two mols of the alcohol, and about ½ volume of inert solvent, and heat the mixture in the presence of a small amount of an acidic catalyst. The water formed by the esterification reaction was removed by refluxing about 9 hours. After esterification was substantially complete, the ester reaction mixture, either as such or diluted with a volatile solvent, e. g., benzene, was washed several times with dilute sodium carbonate solution and with water. The solvent was removed by evaporation on a steam bath, followed by blowing with nitrogen gas accompanied by use of vacuum, at about 95° C.

In each case, the ester was then polymerized in the absence of a solvent, with 1% of benzoyl peroxide as catalyst, at a temperature of approximately 80° C. in a nitrogen atmosphere for about 40–45 hours.

The total crude fumarate ester polymers were then blended in .2% concentration in the three different paraffinic lubricating oil base stocks mentioned above (which differed from each other chiefly only in the extent of dewaxing), and were tested for ASTM pour point. The results of this series of tests are shown in the following table:

| No. of C's | Alcohol used in fumarate polymerize | ASTM Pour Points (°F.) in— | | |
|---|---|---|---|---|
| | | Oil A | Oil B | Oil C |
| None | | 5 | 15 | 30 |
| 4 | n-butyl | 5 | 15 | 30 |
| 6 | n-hexyl | 5 | 15 | 30 |
| 8 | n-octyl | 5 | 15 | 30 |
| 8 | 2-ethyl hexyl | 5 | 15 | 30 |
| 10 | n-decyl | 0 | 15 | 30 |
| 12 | n-lauryl | −15 | −15 | −20 |
| 14 | n-tetradecyl | 5 | 0 | 10 |
| 16 | n-cetyl | 0 | 10 | 30 |
| 18 | n-octadecyl | 0 | 20 | 30 |

It is apparent from the above data that the C₁₂ (lauryl) and C₁₄ (tetradecyl) were the only ones out of the entire list of alcohols ranging from 1 to 18 carbon atoms which gave polymers having any substantial pour depressing property in waxy mineral lubricating oils, and of these two alcohols, the $C_{12}$ was much more effective than the $C_{14}$.

The polylauryl fumarate polymer also shows excellent pour stability characteristics, because an 0.2 weight per cent blend of this polymer in oil C base stock did not go solid in a cycling type pour stability test even at temperatures as low as $-10°$ F., whereas a similar blend of a commercial pour depressor on the market, which gave ASTM pour points ranging from $-20°$ to $-30°$ F. in the same oil base stocks A, B and C, went solid at $20°$ F. when tested in oil C in the same pour stability test, which involves subjecting the blend to alternate cooling and warming at various temperatures more or less simulating field storage conditions.

The details of the preparation and polymerization of the di-n dodecyl (lauryl) fumarate used in the above tests are as follows:

A 3 liter round bottom flask equipped with a water trap and a reflux condenser was charged with:

932 g. n dodecanol of at least 90% purity
290 g. fumaric acid
2 g. sulfosalicylic acid
400 cc. xylene
200 cc. 54 naphtha The above mixture was refluxed for 9 hours during which time 89 cc. of water was collected in the water trap. The reaction mixture was then given 2 washes with 5% sodium carbonate followed by one water wash. Most of the solvent was removed by evaporation on a steam bath although the final traces were removed by the use of $N_2$ and laboratory vacuum at $95°$ C. The resulting di-n dodecyl fumarate ester had a saponification number of 248 and a neutralization number of 0.36 and with a viscosity at $210°$ F. of 42.6 Saybolt seconds. A 25 x 200 mm. test tube was charged with 25 g. of the above prepared ester and placed in a bath at $80°$ C. After replacing the air in the test tube with $N_2$, 0.25 g. of benzoyl peroxide was added and the mixture blown with $N_2$ until the peroxide was dissolved in the ester. The test tube was then stoppered and allowed to remain in the bath for 40 hours. At the end of the 40 hours the polymer which was produced was of a light color and had a viscosity at $210°$ F. of 1107 Saybolt seconds.

The following blends of the above prepared polymerized di-n dodecyl fumarate were made in paraffin base oils designated as A, B and C.

| Additive(s) | Oil A | Oil B | Oil C | Condition of Blend Severe Temperature Cycle |
|---|---|---|---|---|
| | °F. | °F. | °F. | |
| None | 5 | 20 | 30 | 30 °F. |
| 0.2% Monomer | 5 | 20 | 30 | 30 °F. |
| 0.2% Polymer | -15 | -15 | -20 | DNGS¹ |
| 0.2% Polymer+0.03% Dodecanol | -10 | -20 | -15 | DNGS¹ |
| 0.2% Polymer+0.09% di-n dodecyl fumarate (monomer) | -10 | -15 | -15 | DNGS¹ |

¹ Did not go solid as low as $-20°$ F.

These tests show that the ester monomer has no pour depressing properties, either as determined by the ASTM pour point test or the pour stability cycle test, but that the polymer had excellent properties in both respects, and that these were not harmed by the presence of small amounts of either the ester monomer or even unreacted alcohol (dodecanol).

Example 2

The details of the preparation of the di-n-tetradecyl fumarate used in the previously described tests are as follows:

A 3-liter flask equipped with a water trap and a reflux condenser was charged with the following:

1072 g. n-tetradecanol
290 g. fumaric acid
1.5 g. sulfosalicylic acid
400 cc. xylene
200 cc. 54 naphtha The above mixture was refluxed for a total of 9 hours, during which time 90 cc. of water was collected. The reaction product was diluted with about 1000 cc. of benzol and then given 2 washes with 5% $Na_2CO_3$ solution and one with water. The larger part of the solvents was removed by evaporation on a steam bath, although the final traces were removed by the use of nitrogen and laboratory vacuum at $95°$ C. The resulting di-n-tetradecyl fumarate ester had a saponification number of 226, neutralization number of 0.36 and a viscosity at $210°$ F. of 46.5 Saybolt seconds.

Using the polymerization procedure described in Example 1, a polymerized di-n-tetradecyl fumarate was obtained which had a viscosity of 494 seconds Saybolt at $210°$ F. and in 0.2% concentration in reference oils A, B and C, gave ASTM pour points of $5°$ F., $0°$ F. and $10°$ F. respectively, which showed substantially pour depressing properties, however this polymer in 0.2% concentration in oil C gave $-22°$ F. as the highest solid point in severe temperature cycles, thereby showing excellent pour stability.

Example 3

Some of the same $C_{14}$ (di-n-tetradecyl) fumarate ester monomer used in Example 2 was polymerized at a higher temperature, namely $140°$ C., and the resulting polymer which had a viscosity of 101 seconds Saybolt at $210°$ F., gave in 0.2% concentration in the same reference oils A, B and C blends having ASTM pour points of $-5°$ F., $-10°$ F., and $-10°$ F. respectively, thereby indicating better results due to the higher temperature of polymerization.

The polymers produced according to this invention are particularly valuable as pour point depressants although they also act as V. I. improvers. They are also valuable as dewaxing aids, and in extreme pressure lubricants, cutting oils, transmission oils, etc.

What is claimed is:

1. A process of preparing an oil soluble polymer which comprises substantially completely esterifying a molar proportion of a fumaric acid with two molar proportions of $C_{12}$ to $C_{14}$ alkyl alcohol in the presence of a small amount of acidic catalyst, accompanied by heating to refluxing temperature, and thereafter polymerizing, said polymerization being carried out at a temperature of about $50°$ to $150°$ C. in the presence of 0.1 to 5.0% of a peroxide catalyst.

2. A process which comprises substantially fully esterifying a fumaric acid with n-lauryl alcohol at substantially reflux temperature and thereafter polymerizing said n-lauryl fumarate at about $80°$ C. for about 5 to 50 hours, using about 1% of benzoyl peroxide as catalyst.

3. A polymerized alkyl substantially fully esterified fumarate ester of an alcohol of 12 to 14 carbon atoms, said polymer having a molecular weight between 1,000 and 40,000.

4. Polymerized dilauryl fumarate having a molecular weight of 1,000 to 40,000.

5. Polymerized dilauryl fumarate having an average molecular weight of about 1,000 to 20,000 and being soluble in mineral oil.

6. Product according to claim 5 having an average molecular weight of about 2,000 to 10,000.

7. Polymerized di-n-tetradecyl fumarate having a molecular weight of about 1,000 to 20,000.

8. A polymerized fumaric acid dialkyl ester of an alcohol having more than 10 but less than 16 carbon atoms said polymer having a molecular weight between about 1,000 and 40,000.

JEFFREY H. BARTLETT.

REFERENCES CITED

The following references are of record in the file of this patent:

UNITED STATES PATENTS

| Number | Name | Date |
|---|---|---|
| 1,945,307 | Dykstra | Jan. 30, 1934 |
| 2,084,501 | Otto | June 22, 1937 |
| 2,195,362 | Ellis | Mar. 26, 1940 |
| 2,227,690 | Arveson | Jan. 7, 1941 |
| 2,375,516 | Blair | May 8, 1945 |
| 2,386,446 | De Groote | Oct. 9, 1945 |

OTHER REFERENCES

Shereshefsky et al.: Journ. Amer. Chem. Soc., vol. 66, pp. 1072–1076 (1944).